United States Patent
Mitchell

(10) Patent No.: US 9,638,023 B2
(45) Date of Patent: May 2, 2017

(54) DETERMINING STRESSES IN A PIPE UNDER NON-UNIFORM EXTERIOR LOADS

(71) Applicant: Landmark Graphics Corporation, Houston, TX (US)

(72) Inventor: Robert F Mitchell, Lookout Mountain, GA (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 14/769,026

(22) PCT Filed: Nov. 27, 2013

(86) PCT No.: PCT/US2013/072173
§ 371 (c)(1),
(2) Date: Aug. 19, 2015

(87) PCT Pub. No.: WO2015/080720
PCT Pub. Date: Jun. 4, 2015

(65) Prior Publication Data
US 2016/0003030 A1 Jan. 7, 2016

(51) Int. Cl.
G01V 13/00 (2006.01)
E21B 47/06 (2012.01)
E21B 47/00 (2012.01)
G01L 7/00 (2006.01)

(52) U.S. Cl.
CPC .......... *E21B 47/06* (2013.01); *E21B 47/0006* (2013.01); *G01L 7/00* (2013.01)

(58) Field of Classification Search
CPC ....................................................... E21B 47/06
USPC ............................................................. 702/11
See application file for complete search history.

(56) References Cited

U.S. PATENT DOCUMENTS

| | | | | |
|---|---|---|---|---|
| 2005/0065730 A1* | 3/2005 | Sinha | ....................... | G01V 1/50 702/7 |
| 2009/0070042 A1* | 3/2009 | Birchwood | .............. | G01V 1/50 702/11 |
| 2011/0137616 A1* | 6/2011 | Tognarelli | ............... | E21B 17/00 703/1 |
| 2014/0013837 A1* | 1/2014 | Lee | ....................... | G01L 5/0004 73/152.59 |

FOREIGN PATENT DOCUMENTS

CN 1598529 A 3/2005

OTHER PUBLICATIONS

Verijenjo etal,; "Stress distribution in continuously heterogeneous thick laminated pressure vessels"; 2001; Elsevier; Composite Structures 54; pp. 371-377.*

(Continued)

*Primary Examiner* — Ricky Ngon
(74) *Attorney, Agent, or Firm* — Polsinelli PC

(57) ABSTRACT

Systems and methods for determining stresses in pipe under non-uniform exterior loads to test the pipe design for structural integrity by approximating non-uniform exterior loads on the pipe and performing a stress analysis of the pipe under the non-uniform exterior loading to determine the stresses in the pipe.

18 Claims, 3 Drawing Sheets

(56) References Cited

OTHER PUBLICATIONS

Liu et al.; "Analyzing Axial Stress and Deformation of Tubular for Steam Injection Process in Deviated Wells Based on the Varied (☐,☐) Fields"; Aug. 2013; Hindawi Publishing Corporation the Scientific World Journal; vol. 2013; pp. 1-9.*
J.B. Cheatham Jr and J.W. McEver, Behavior of Casing Subjected to Salt Loading, Journal of Petroleum Technology, Sep. 1964, pp. 1069-1075, Society of Petroleum Engineers; Casper, Wyoming, US.
R.M. Hackney, A New Approach to Casing Design for Salt Formations, SPE/IADC, Mar. 6, 1985, pp. 79-85, SPE/IADC 1985 Conference, New Orleans, Louisiana, US.
S.M. Willson, A.F. Fossum, and J.T.Fredrich, Assessment of Salt Loading on Well Casings, Feb. 26, 2002, pp. 13-21, Society of Petroleum Engineers, Dallas, Texas, US.
P.D. Pattillo, Z.A. Moschovidis, and Manohar Lal, An Evaluation of Concentric Casing for Nonuniform Load Applications, SPE Drilling & Completion, Aug. 2, 1994, pp. 186-192, Society of Petroleum Engineers, US.
Commissioner; International Search Report and the Written Opinion of the International Searching Authority; PCT/US13/72173; Aug. 28, 2014; 10 pgs.; ISA/KR.
Jianzeng, et al.; Nonuniform Loading Affects Casing Collapse Resistance; The Oil & Gas Journal, vol. 99, No. 25; Jun. 18, 2001; pp. 45-49.
Lin, et al.; Empirical Formula Given for Collapse Resistance of Worn Casing Under Nonuniform Loading; The Oil & Gas Journal, vol. III, No. 2; Feb. 4, 2013; pp. 60-62 & 64-66.
Guohua et al; Study on the Effect of Non-Uniformity Load and Casing Eccentricity on the Casing Strength; Energy Procedia, vol. 11; 2012; pp. 285-291.
Wilson, et al.; Assessment of Salt Loading on Well Casings; SPE Drilling & Completion; Mar. 2003; pp. 13-21.
O'Connnell, Wayne; First Examination Report; dated Jun. 6, 2016; 2 pages; Patent Application No. 2013406219; Australian Government Intellectual Property Office; Woden, Australia.
Rice, FB; Response to First Exam Report; dated Jun. 14, 2016; 24 pages; Patent Application No. 2013406219; FB Rice Patent & Trademark Attorneys; Melbourne, Australia.
Dr. Lyndon Ellis; First Examination Report; dated Jun. 27, 2016; 3 pages; Patent Application No. GB1607294.4; Intellectual Property Office; South Wales.
Tran, Chau; First Examination Report; dated Jun. 23, 2016; 6 pages; Patent Application No. 2928732; Canadian Intellectual Property Office; Alberta, Canada.
Verijenko, et, al; "Stress Distribution in Continuously Heterogeneous Thick Laminated Pressure Vessels",; Composite Structure;dated 2001; 54 Pages; pp. 371-377.

* cited by examiner

DETERMINING STRESSES IN A PIPE UNDER NON-UNIFORM EXTERIOR LOADS

CROSS-REFERENCE TO RELATED APPLICATIONS

This application claims the priority of PCT Patent Application No. PCT/US13/72173, filed on Nov. 27, 2013, which is incorporated herein by reference.

STATEMENT REGARDING FEDERALLY SPONSORED RESEARCH

Not applicable.

FIELD OF THE DISCLOSURE

The present disclosure generally relates to systems and methods for determining stresses in pipe under non-uniform exterior loads. More particularly, the present disclosure relates to determining stresses in pipe under non-uniform exterior loads to test the pipe design for structural integrity.

BACKGROUND

A natural resource such as oil or gas residing in a subterranean formation can be recovered by drilling a well into the formation. The subterranean formation is usually isolated from other formations using a technique known as cementing. In particular, a wellbore is typically drilled down to the subterranean formation while circulating a drilling fluid through the wellbore. After the drilling is terminated, a string of pipe (e.g. casing string) is run in the wellbore. Primary cementing is then usually performed whereby a cement slurry is pumped down through the casing string and into the annulus between the casing string and the wall of the wellbore or another casing string to allow the cement slurry to set into an impermeable cement column and thereby fill a portion of the annulus. Sealing the annulus typically occurs near the end of cementing operations after well completion fluids, such as spacer fluids and cements, are trapped in place to isolate these fluids within the annulus from areas outside the annulus. The annulus is conventionally sealed by closing a valve, energizing a seal, and the like.

In addition to the uniform exterior loads placed on the casing, non-uniform exterior loads are also placed on the casing as a result of pressure loading from salt and overburden loading in horizontal wells, for example. Overburden and lateral formation pressures cause salt to flow, closing the wellbore outside the casing. Because the lateral formation pressures may not be equal, or because the wellbore is not perfectly circular, the loading from the salt will not, in general, be uniform. In a horizontal well, overburden loads may cause the wellbore to deform vertically, contacting the casing and producing a pressure load.

Conventional well known finite element analysis techniques have been used to test the casing design for structural integrity when the casing is under non-uniform exterior loads, however, such techniques are complex, time consuming, and may not be appropriate for a general casing design program. Other, less popular, techniques use the equations of equilibrium for a shell to test the casing design for structural integrity when the casing is under non-uniform exterior loads. The loading is discontinuous and equal to a positive load over an angle $\theta < \theta_1$, where $\theta_1$ has been determined from experimental data to be $\pi/20$ or about 9°. The solution is obtained using the principle of virtual work and the conservative assumption that the radius of the shell is equal to outer radius rather than the average radius. Bending, hoop, and shear stresses may be obtained from the solution, since bending moment, circumferential force, and shear force are determined from the equilibrium equations. Because radial loads are not considered in this technique, the solution is merely an approximation. Moreover, because this technique assumes a thin wall radius, it is generally unacceptable for testing the structural integrity of most casing designs.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1:
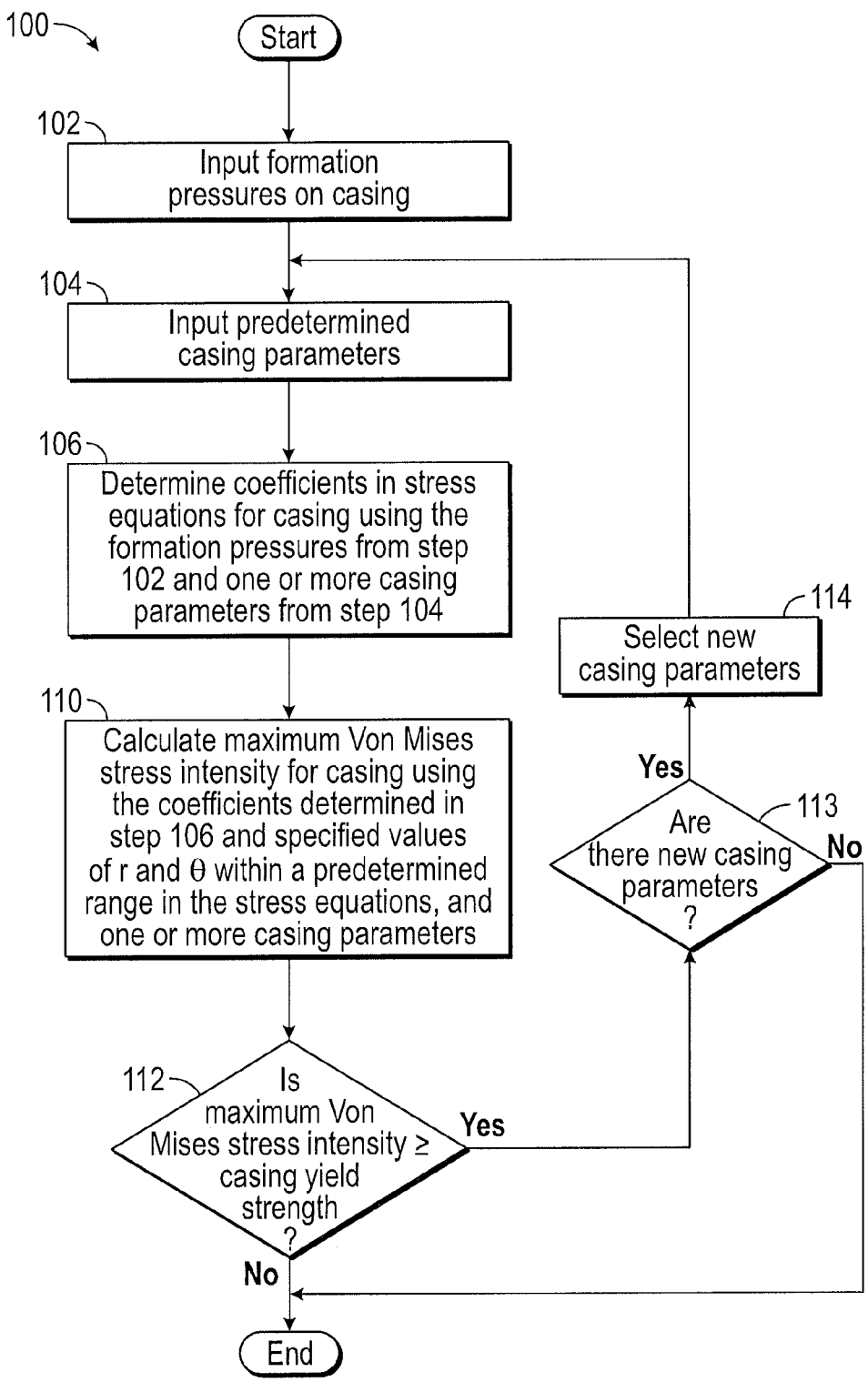
FIG. 1 is a flow diagram illustrating one embodiment of a method for implementing the present disclosure.

The present disclosure overcomes one or more deficiencies in the prior art by providing systems and methods for determining stresses in pipe under non-uniform exterior loads to test the pipe design for structural integrity.

In one embodiment, the present disclosure includes a method for determining stresses in a pipe under non-uniform exterior loads, which comprises: a) determining coefficients in multiple stress equations for the pipe by solving boundary condition equations using a maximum lateral pressure on the pipe, a minimum lateral pressure on the pipe, an inside radius of the pipe and an outside radius of the pipe; b) solving two of the multiple stress equations that each represent a radial stress for the pipe, two of the multiple stress equations that each represent a hoop stress for the pipe, which are added together to represent a total radial stress and a total hoop stress, and one of the multiple stress equations that represents a total shear stress for the pipe using one or more of the coefficients, a predetermined pipe radius and a predetermined pipe angle; and c) calculating a stress intensity for the pipe using a computer processor, the total radial stress, the total hoop stress, the total shear stress and a predetermined total axial stress for the pipe.

In another embodiment, the present disclosure includes a non-transitory program carrier device tangibly carrying computer executable instructions for determining stresses in a pipe under non-uniform exterior loads, the instructions being executable to implement: a) determining coefficients in multiple stress equations for the pipe by solving boundary condition equations using a maximum lateral pressure on the pipe, a minimum lateral pressure on the pipe, an inside radius of the pipe and an outside radius of the pipe; b) solving two of the multiple stress equations that each represent a radial stress for the pipe, two of the multiple stress equations that each represent a hoop stress for the pipe, which are added together to represent a total radial stress and a total hoop stress, and one of the multiple stress equations that represents a total shear stress for the pipe using one or more of the coefficients, a predetermined pipe radius and a predetermined pipe angle; and c) calculating a stress intensity for the pipe using the total radial stress, the total hoop stress, the total shear stress and a predetermined total axial stress for the pipe.

In yet another embodiment, the present disclosure includes a non-transitory program carrier device tangibly carrying computer executable instructions for determining stresses in a pipe under non-uniform exterior loads, the instructions being executable to implement: a) determining coefficients in multiple stress equations for the pipe by solving boundary condition equations using a maximum lateral pressure on the pipe, a minimum lateral pressure on the pipe, an inside radius of the pipe and an outside radius of the pipe; b) solving the multiple stress equations that represent a radial stress for the pipe, two of the multiple stress equations that represent a loop stress for the pipe; which are added together to represent a total radial stress and a total hoop stress, and one of the multiple stress equations that represents a total shear stress for the pipe using one or more of the coefficients, a predetermined pipe radius and a predetermined pipe angle; c) calculating a stress intensity for the pipe using the total radial stress, the total hoop stress, the total shear stress, and a predetermined total axial stress for the pipe; and d) repeating steps b)-c) with another predetermined pipe radius and another predetermined pipe angle until a maximum stress intensity for the pipe is calculated.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

Method Description

Referring now to FIG. 1, a flow diagram of one embodiment of a method 100 for implementing the present disclosure is illustrated. The method 100 approximates non-uniform exterior loads on a pipe (e.g. casing) and performs a stress analysis of the pipe to test the pipe design for structural integrity. Although FIGS. 1-4 are described herein with reference to casing as an example of pipe under non-uniform exterior loads caused by salt loading, any other type of pipe under non-uniform exterior loads may be used and analyzed in the same manner.

Stresses in casing due to uniform internal and external fluid pressure distributions are usually determined by solving well known Lame's stress equations 1(a) and 1(b):

$$\sigma_{r1} = \frac{r_i^2 r_o^2 (p_o - p_i)}{(r_o^2 - r_i^2) r^2} + \frac{(p_i r_i^2 - p_o r_o^2)}{r_o^2 - r_i^2} \qquad 1(a)$$

$$\sigma_{\theta 1} = -\frac{r_i^2 r_o^2 (p_o - p_i)}{(r_o^2 - r_i^2) r^2} + \frac{(p_i r_i^2 - p_o r_o^2)}{r_o^2 - r_i^2} \qquad 1(b)$$

where $\sigma_{r1}$ is the radial stress as a function of r, $\sigma_{\theta 1}$ is the hoop stress as a function of r, $p_i$ is the inside pressure, $p_o$ is the outside pressure, r is the radius, $r_i$ is the inside radius, and $r_o$ is the outside radius.

A new solution exists for determining stresses in casing due to a non-uniform exterior pressure distribution that has a maximum value at $\theta=0,\pi$ and a minimum value at $\theta=\pi/2, 3\pi/2$, which is represented by solving stress equations 2(a), 2(b), and 2(c):

$$\sigma_{r2} = -\frac{2\cos(2\theta)(4c_1 + 3c_0 r^2 - c_3 r^{10})}{r^6} \qquad 2(a)$$

$$\sigma_{\theta 2} = \frac{2\cos(2\theta)(3c_0 r^2 + 10c_1 + 6c_2 r^8 + 15c_3 r^{10})}{r^6} \qquad 2(b)$$

$$\tau_{r\theta} = -\frac{2\sin(2\theta)(3c_0 r^2 + 5c_1 - 3c_2 r^8 - 5c_3 r^{10})}{r^6} \qquad 2(c)$$

where $\sigma_{r2}$ is the radial stress as a function of r and $\theta$, $\sigma_{\theta 2}$ is the hoop stress as a function of r and $\theta$, $\tau_{r\theta}$ is the shear stress as a function of r and $\theta$, and $c_0$-$c_3$ are unknown coefficients. By appropriate choice of the coefficients, a combination of stress equations 1(a), 1(b) and stress equations 2(a), 2(b), 2(c) provides a complete description of the stresses in the casing due to internal and external fluid pressure distributions and a non-uniform exterior pressure distribution caused by, for example, salt loading.

Figure 2:
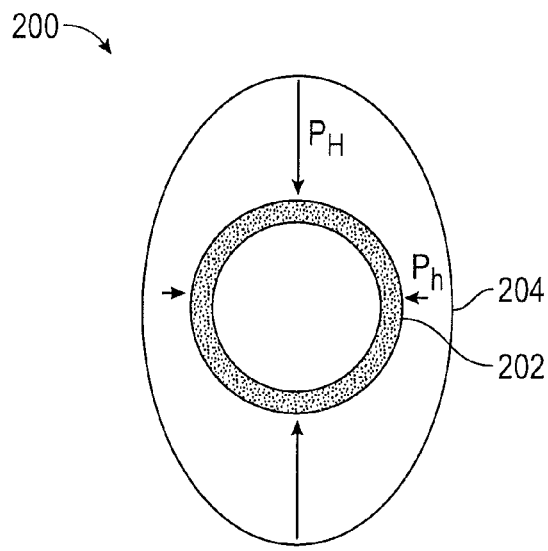
FIG. 2 is a schematic display illustrating non-uniform exterior loads on a section of casing caused by salt loading.
Figure 3:
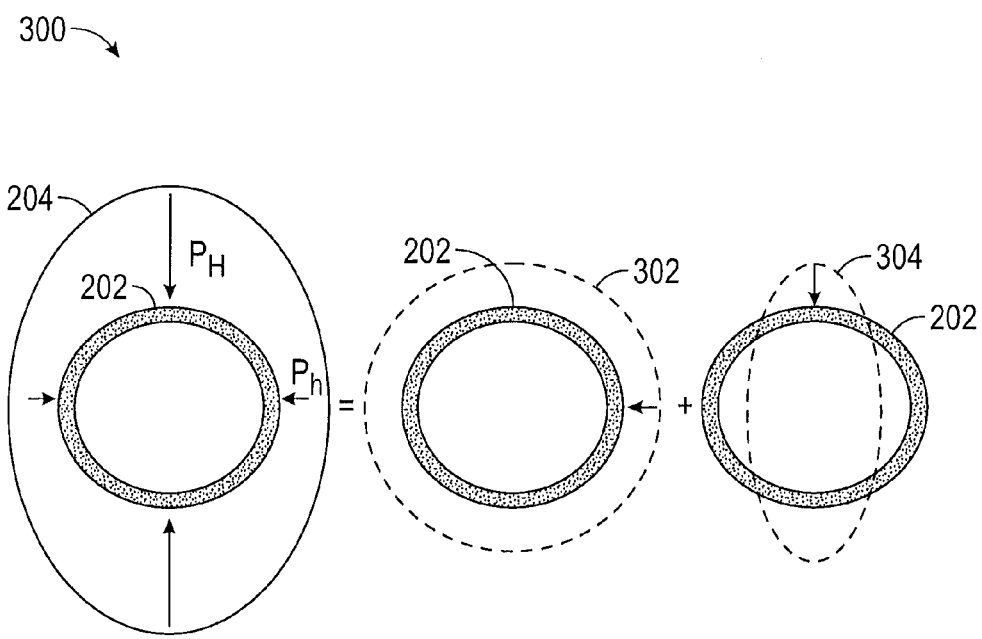
FIG. 3 is a schematic display illustrating the non-uniform exterior loads on the section of casing in FIG. 2, which are decomposed into two additional schematic displays representing a uniform pressure distribution and a non-uniform pressure distribution.

In FIG. 2, for example, a schematic display 200 illustrates non-uniform exterior loads on a section of casing 202 caused by salt loading 204. These loads include a maximum lateral pressure $P_H$ and a minimum lateral pressure $P_h$ in the directions indicated. In FIG. 3, the schematic display 300 illustrates the non-uniform exterior loads on the section of casing in FIG. 2, which are decomposed into two additional schematic displays representing a uniform pressure distribution 302 and a non-uniform pressure distribution 304 that correspond to stress equations 1(a), 1(b) and stress equations 2(a), 2(b), and 2(c), respectively.

The boundary conditions for the section of casing 202 in FIG. 2 are represented by equations 3(a)-3(e):

$$\sigma_r = p_H, r = r_o, \theta = 0 \qquad 3(a)$$

$$\sigma_r = -p_h, r = r_o, \theta = \pi/2 \qquad 3(b)$$

$$\sigma_r = -P_i, r = r_i \qquad 3(c)$$

$$\tau_{r\theta} = 0, r = r_i \qquad 3(d)$$

$$\tau_{r\theta} = 0, r = r_o \qquad 3(e)$$

The boundary conditions represented by equations 3(a)-3(e) can be solved by first solving for $p_o$ and $p_i$ using a known maximum lateral pressure $P_H$, a known minimum lateral pressure $P_h$ and equations 4(a), 4(b):

$$p_o = \tfrac{1}{2}(P_H + P_h) \qquad 4(a)$$

$$p_i = P_i \qquad 4(b)$$

Given $p_o$ and $p_i$, the boundary conditions represented by equations 3(a)-3(e) now decompose into boundary conditions for stress equations 2(a), 2(b), 2(c), which are represented by equations 5(a)-5(d):

$$\sigma_r = -\tfrac{1}{2}(P_H - P_h), \theta = 0, r = r_o \qquad 5(a)$$

$$\sigma_r = 0, r = r_i \qquad 5(b)$$

$$\tau_{r\theta} = 0, r = r_i \qquad 5(c)$$

$\tau_{r\theta}=0, r=r_o$        5(d)

Referring again to FIG. 1, the method 100 relies on the foregoing equations to approximate non-uniform exterior loads on the casing and perform a stress analysis of the pipe to test the pipe design for structural integrity.

Figure 4:
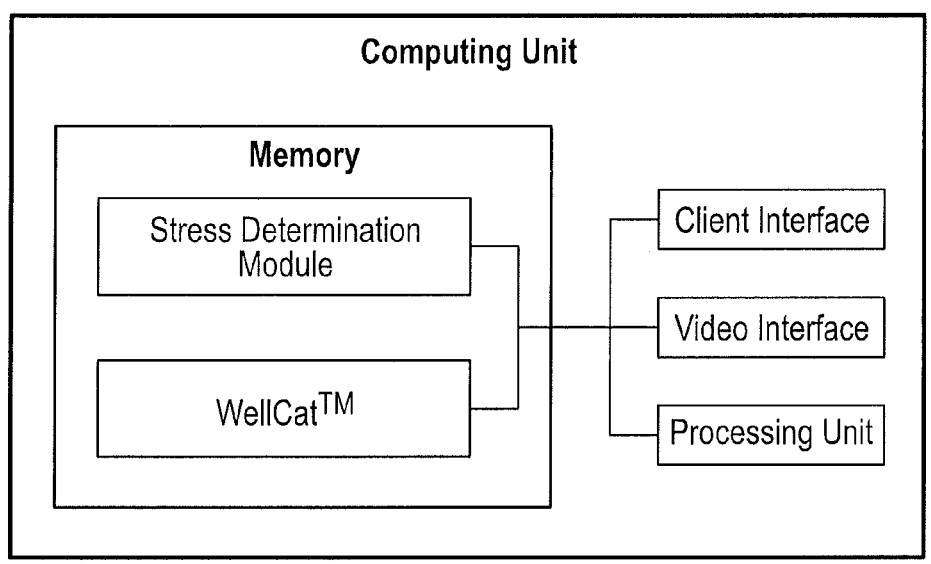
FIG. 4 is a block diagram illustrating one embodiment of a computer system for implementing the present disclosure.

In step 102, formation pressures on the casing are automatically input or they may be manually input using the client interface and/or the video interface described further in reference to FIG. 4. The formation pressures may include, for example, a maximum lateral pressure $P_H$ and a minimum lateral pressure $P_h$.

In step 104, predetermined casing parameters are automatically input or they may be manually input using the client interface and/or the video interface described further in reference to FIG. 4. The casing parameters may include, for example, an inside diameter, an outside diameter, an axial stress $\sigma_z$ and a yield strength $\sigma_y$ for the casing. The inside diameter and outside diameter are easily converted to an inside radius $r_i$ and an outside radius $r_o$ using well known mathematical principles. The casing yield strength represents a known stress value at which the casing will demonstrate failure.

In step 106, coefficients (i.e. $P_o$, $p_i$, and $c_0$-$c_3$) in stress equations 1(a), 1(b) and stress equations 2(a), 2(b), 2(c) for the casing are determined by solving equations 4(a), 4(b) and equations 5(a)-5(d) using the formation pressures from step 102, one or more casing parameters from step 104 and techniques well known in the art.

In step 110, a maximum Von Mises stress intensity is calculated for the casing using equation (6):

$$\sigma_{vm} = \sqrt{\tfrac{1}{2}[(\sigma_r - \sigma_\theta)^2 + (\sigma_\theta - \sigma_z)^2 + (\sigma_z - \sigma_r)^2] + 3\tau_{r\theta}^2} \quad (6)$$

to calculate the Von Mises stress intensity for specified values of r and θ (i.e. a point in the casing) within a predetermined range for r and θ (e.g. ri<r<ro, 0<θ<π). The total radial stress and the total hoop stress in equation (6) are calculated using the coefficients determined in step 106 and the specified values of r and θ to solve for the radial stress and the hoop stress in stress equations 1(a), 1(b) and in stress equations 2(a), 2(b), which are added together. The total axial stress $\sigma_z$ in equation (6) is taken from step 104 and the total shear stress is taken from the result of equation 2(c) using the specified values of r and θ and one or more of the coefficients. In this manner, the Von Mises stress intensity, which represents a stress value for the casing, can be calculated for any point in the casing to determine the maximum Von Mises stress intensity and whether the casing is near or beyond the point of failure. There are many well known methods that may be used to determine the values of r and θ that will produce a maximum Von Mises stress intensity.

In step 112, the method 100 determines if the maximum Von Mises stress intensity calculated in step 110 is greater than or equal to the casing yield strength from step 104. If the maximum Von Mises stress intensity is greater than or equal to the casing yield strength, then the method 100 proceeds to step 113. If the maximum Von Mises stress intensity is not greater than or equal to the casing yield strength, then the method 100 ends because the structural integrity of the casing is within acceptable limits.

In step 113, the method 100 determines if there are any new casing parameters to try for determining if the maximum Von Mises stress intensity is greater than or equal to the casing yield strength in step 112 based on an independent evaluation of the available casing parameters. If there are new casing parameters, then the method 100 proceeds to step 114. If there are no new casing parameters, then the method 100 ends because there are no more new casing parameters that will produce a Von Mises stress intensity that is less than the casing yield strength.

In step 114, new casing parameters are automatically selected for the inside diameter, the outside diameter and the yield strength of the casing or they may be manually selected using the client interface and/or the video interface described further in reference to FIG. 4. The new casing parameters are selected based on parameters that may yield a Von Mises stress intensity that is less than the casing yield strength.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. WellCat™, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 4, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIG. 1. The memory therefore, includes a stress determination module, which enables step 106 described in reference to FIG. 1. The stress determination module may integrate functionality from the remaining application programs illustrated in FIG. 4. In particular, WellCat™ may be used as an interface application to perform the remaining steps in FIG. 1. Although WellCat™ may be used as interface application, other interface applications may be used, instead, or the stress determination module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for determining stresses in a pipe under non-uniform exterior loads, which comprises:
 a) determining coefficients in multiple stress equations for the pipe by solving boundary condition equations using a maximum lateral pressure on the pipe, a minimum lateral pressure on the pipe, an inside radius of the pipe and an outside radius of the pipe;
 b) solving two of the multiple stress equations that each represent a radial stress for the pipe, two of the multiple stress equations that each represent a hoop stress for the pipe, which are added together to represent a total radial stress and a total hoop stress, and one of the multiple stress equations that represents a total shear stress for the pipe using one or more of the coefficients, a predetermined pipe radius and a predetermined pipe angle;
 c) calculating a stress intensity for the pipe using a computer processor, the total radial stress, the total hoop stress, the total shear stress and a predetermined total axial stress for the pipe,
 d) repeating steps b)-c) with another predetermined pipe radius and another predetermined pipe angle until a maximum stress intensity for the pipe is calculated;
 e) selecting the pipe based on the maximum stress intensity for the pipe; and
 f) installing the selected pipe in a wellbore.

2. The method of claim 1, wherein the predetermined pipe radius and the predetermined pipe angle are each within a respective predetermined range.

3. The method of claim 2, wherein the predetermined range for the predetermined pipe radius is greater than the inside radius of the pipe and is less than the outside radius of the pipe.

4. The method of claim 3, wherein the predetermined range for the predetermined pipe angle is greater than zero and is less than a.

5. The method of claim 1, wherein the two of the multiple stress equations that represent the radial stress are:

$$\sigma_{r1} = \frac{r_i^2 r_o^2 (p_o - p_i)}{(r_o^2 - r_i^2) r^2} + \frac{(p_i r_i^2 - p_o r_o^2)}{r_o^2 - r_i^2}$$

$$\sigma_{r2} = -\frac{2\cos(2\theta)(4c_1 + 3c_0 r^2 - c_3 r^{10})}{r^6}$$

the two of the multiple stress equations that represent the hoop stress are:

$$\sigma_{\theta 1} = -\frac{r_i^2 r_o^2 (p_o - p_i)}{(r_o^2 - r_i^2) r^2} + \frac{(p_i r_i^2 - p_o r_o^2)}{r_o^2 - r_i^2}$$

-continued
$$\sigma_{\theta 2} = \frac{2\cos(2\theta)(3c_0 r^2 + 10c_1 + 6c_2 r^8 + 15c_3 r^{10})}{r^6}$$

and the one of the multiple stress equations that represents the total shear stress is:

$$\tau_{r\theta} = -\frac{2\sin(2\theta)(3c_0 r^2 + 5c_1 - 3c_2 r^8 - 5c_3 r^{10})}{r^6}$$

$r_i$ is the inside radius, $r_o$ is the outside radius, r is the predetermined pipe radius, $\theta$ is predetermined pipe angle, and $p_o$, $p_i$, $c_0$-$c_3$ are the coefficients.

6. The method of claim 5, further comprising calculating $p_o$ and $p_i$ using:

$$p_o = \tfrac{1}{2}(P_H + P_h)$$

$$p_i = P_i$$

wherein $p_o$ is an outside pressure on the pipe, $p_i$ is an inside pressure on the pipe, $P_H$ is the maximum lateral pressure on the pipe and $P_h$ is the minimum lateral pressure on the pipe.

7. The method of claim 1, wherein the stress intensity is calculated using:

$$\sigma_{vm} = \sqrt{\tfrac{1}{2}[(\sigma_r - \sigma_\theta)^2 + (\sigma_\theta - \sigma_z)^2 + (\sigma_z - \sigma_r)^2] + 3\tau_{r\theta}^2}$$

$\sigma_r$ is the total radial stress, $\sigma_\theta$ is the total hoop stress, $\sigma_2$ is the total axial stress and $\tau_{r\theta}$ is the total shear stress.

8. The method of claim 1, further comprising:
 comparing the maximum stress intensity and a yield strength for the pipe; and
 selecting another inside radius of the pipe, another outside radius of the pipe an another yield strength for the pipe.

9. A non-transitory program carrier device tangibly carrying computer executable instructions for determining stresses in a pipe under non-uniform exterior loads, the instructions being executable to implement:
 a) determining coefficients in multiple stress equations for the pipe by solving boundary condition equations using a maximum lateral pressure on the pipe, a minimum lateral pressure on the pipe, an inside radius of the pipe and an outside radius of the pipe;
 b) solving two of the multiple stress equations that each represent a radial stress for the pipe, two of the multiple stress equations that each represent a hoop stress for the pipe, which are added together to represent a total radial stress and a total hoop stress, and one of the multiple stress equations that represents a total shear stress for the pipe using one or more of the coefficients, a predetermined pipe radius and a predetermined pipe angle;
 c) calculating a stress intensity for the pipe using the total radial stress, the total hoop stress, the total shear stress and a predetermined total axial stress for the pipe;
 d) repeating steps b)-c) with another predetermined pipe radius and another predetermined pipe angle until a maximum stress intensity for the pipe is calculated;
 e) selecting the pipe based on the maximum stress intensity for the pipe; and
 f) installing the selected pipe in a wellbore.

10. The program carrier device of claim 9, wherein the predetermined pipe radius and the predetermined pipe angle are each within a respective predetermined range.

11. The program carrier device of claim 10, wherein the predetermined range for the predetermined pipe radius is greater than the inside radius of the pipe and is less than the outside radius of the pipe.

12. The program carrier device of claim 11, wherein the predetermined range for the predetermined pipe angle is greater than zero and is less than $\pi$.

13. The program carrier device of claim 9, wherein the two of the multiple stress equations that represent the radial stress are:

$$\sigma_{r1} = \frac{r_i^2 r_o^2 (p_o - p_i)}{(r_o^2 - r_i^2) r^2} + \frac{(p_i r_i^2 - p_o r_o^2)}{r_o^2 - r_i^2}$$

$$\sigma_{r2} = -\frac{2\cos(2\theta)(4c_1 + 3c_0 r^2 - c_3 r^{10})}{r^6}$$

the two of the multiple stress equations that represent the hoop stress are:

$$\sigma_{\theta 1} = -\frac{r_i^2 r_o^2 (p_o - p_i)}{(r_o^2 - r_i^2) r^2} + \frac{(p_i r_i^2 - p_o r_o^2)}{r_o^2 - r_i^2}$$

$$\sigma_{\theta 2} = \frac{2\cos(2\theta)(3c_0 r^2 + 10c_1 + 6c_2 r^8 + 15c_3 r^{10})}{r^6}$$

and the one of the multiple stress equations that represents the total shear stress is:

$$\tau_{r\theta} = -\frac{2\sin(2\theta)(3c_0 r^2 + 5c_1 - 3c_2 r^8 - 5c_3 r^{10})}{r^6}$$

$r_i$ is the inside radius, $r_o$ is the outside radius, r is the predetermined pipe radius, $\theta$ is predetermined pipe angle, and $p_o$, $p_i$, $c_0$-$c_3$ are the coefficients.

14. The program carrier device of claim 13, further comprising calculating $p_o$ and $p_i$ using:

$$p_o = \tfrac{1}{2}(P_H + P_h)$$

$$p_i = P_i$$

wherein $p_o$ is an outside pressure on the pipe, $p_i$ is an inside pressure on the pipe, $P_H$ is the maximum lateral pressure on the pipe and $P_h$ is the minimum lateral pressure on the pipe.

15. The program carrier device of claim 9, wherein the stress intensity is calculated using:

$$\sigma_{vm} = \sqrt{\tfrac{1}{2}[\sigma_r - \sigma_\theta)^2 + (\sigma_\theta - \sigma_z)^2 + (\sigma_z - \sigma_r)^2] + 3\tau_{r\theta}^2}$$

$\sigma_r$ is the total radial stress, $\sigma_\theta$ is the total hoop stress, $\sigma_2$ is the total axial stress and $\tau_{r\theta}$ is the total shear stress.

16. The program carrier device of claim 10, further comprising:
 comparing the maximum stress intensity and a yield strength for the pipe; and
 selecting another inside radius of the pipe, another outside radius of the pipe an another yield strength for the pipe.

17. A non-transitory program carrier device tangibly carrying computer executable instructions for determining stresses in a pipe under non-uniform exterior loads, the instructions being executable to implement:
 a) determining coefficients in multiple stress equations for the pipe by solving boundary condition equations using a maximum lateral pressure on the pipe, a minimum lateral pressure on the pipe, an inside radius of the pipe and an outside radius of the pipe;

b) solving the multiple stress equations that represent a radial stress for the pipe, two of the multiple stress equations that represent a loop stress for the pipe; which are added together to represent a total radial stress and a total hoop stress, and one of the multiple stress equations that represents a total shear stress for the pipe using one or more of the coefficients, a predetermined pipe radius and a predetermined pipe angle;

c) calculating a stress intensity for the pipe using the total radial stress, the total hoop stress, the total shear stress, and a predetermined total axial stress for the pipe; and d) repeating steps b)-c) with another predetermined pipe radius and another predetermined pipe angle until a maximum stress intensity for the pipe is calculated;

e) selecting the pipe based on the maximum stress intensity for the pipe; and f) installing the selected pipe in a wellbore.

18. The program carrier device of claim 17, wherein the predetermined pipe radius and the predetermined pipe angle are each within a respective predetermined range.

* * * * *